United States Patent
Mubarekyan (10) Patent No.: US 8,789,936 B2
(45) Date of Patent: Jul. 29, 2014

(54) FIXER FLUID COMPOSITION AND INKJET INK SETS INCLUDING THE SAME

(75) Inventor: Ervin Mubarekyan, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 375 days.

(21) Appl. No.: 13/259,604

(22) PCT Filed: Feb. 12, 2010

(86) PCT No.: PCT/US2010/024003
§ 371 (c)(1), (2), (4) Date: Sep. 23, 2011

(87) PCT Pub. No.: WO2011/099977
PCT Pub. Date: Aug. 18, 2011

(65) Prior Publication Data
US 2012/0019588 A1  Jan. 26, 2012

(51) Int. Cl.
*B41J 2/01* (2006.01)
*B41J 2/21* (2006.01)

(52) U.S. Cl.
CPC . *B41J 2/01* (2013.01); *B41J 2/2107* (2013.01)
USPC ............................................. 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21

USPC .......... 347/100, 95, 96, 102, 103, 88, 99, 21, 347/22, 9, 105; 106/31.6, 31.13, 31.27; 523/160, 161

See application file for complete search history.

(56) References Cited

U.S. PATENT DOCUMENTS

| | | | |
|---|---|---|---|
| 6,538,047 B1 | 3/2003 | Miyabayashi | |
| 6,645,281 B2 | 11/2003 | Yabuki et al. | |
| 7,122,077 B2 * | 10/2006 | Bauer et al. | 347/100 |
| 7,479,179 B2 | 1/2009 | Szajewski | |
| 2002/0144626 A1 | 10/2002 | Schut | |
| 2004/0201658 A1 * | 10/2004 | Jackson et al. | 347/100 |
| 2005/0030360 A1 | 2/2005 | Bauer et al. | |

(Continued)

FOREIGN PATENT DOCUMENTS

WO  2008131174 A1  10/2008

OTHER PUBLICATIONS

International Search Report for International Application No. PCT/US2010/024003 mailed on May 23, 2011.

(Continued)

*Primary Examiner* — Manish S Shah
(74) *Attorney, Agent, or Firm* — Sandra Beccarelli (57) ABSTRACT

A fixer fluid composition, for inkjet printing, and ink set containing it. A disclosed example fixer fluid composition includes up to about 1.5 wt % of surfactants, from about 1 to about 20 wt % of humectants, from about 3 to about 16 wt % of a metal carboxylate salt as fixer agent, and an acid in view of adjusting the pH of said composition to a pH between about 5.0 and about 7.0. A disclosed example of ink set includes, at least, an ink composition including a colorant dispersed in an ink vehicle and said fixer fluid.

13 Claims, 1 Drawing Sheet

(56) References Cited

U.S. PATENT DOCUMENTS

| | | |
|---|---|---|
| 2006/0023044 A1* | 2/2006 | Bauer .......................... 347/100 |
| 2006/0092251 A1* | 5/2006 | Prasad et al. ................. 347/100 |
| 2007/0100022 A1 | 5/2007 | Mubarekyan et al. |
| 2007/0229636 A1* | 10/2007 | Mubarekyan et al. ....... 347/100 |
| 2008/0257203 A1* | 10/2008 | Choy et al. ................ 106/31.13 |
| 2008/0259100 A1 | 10/2008 | Rengaswamy et al. |
| 2009/0239004 A1 | 9/2009 | Ming |
| 2009/0295893 A1* | 12/2009 | Akiyama et al. ................ 347/96 |

OTHER PUBLICATIONS

Written Opinion for International Application No. PCT/US2010/024003 dated May 20, 2011.

\* cited by examiner

FIXER FLUID COMPOSITION AND INKJET INK SETS INCLUDING THE SAME

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection, piezoelectric pressure or oscillation, onto the surface of a media.

There are several reasons that inkjet printing has become a popular way of recording images on various media surfaces, particularly paper. Some of these reasons include low printer noise, capability of high-speed recording, high quality and multi-color recording. Additionally, these advantages can be obtained at a relatively low price to consumers. However, though there has been great improvement in inkjet printing, accompanying this improvement are increased demands by consumers in this area, e.g., higher speeds, higher resolution, full color image formation, increased stability, more permanent images, etc.

Sets of inkjet inks are used in color inkjet printing systems. The ink set often includes a plurality of different colored inks, commonly in groups of four, six or eight colors (e.g., one or more shades of cyan, magenta, yellow and/or black), and may further include an image fixing/fixer fluid. The fixer fluid is often applied before or after an ink is established on the print media surface. The fixer fluid is a substantially colorless liquid that interacts with the colorant and/or polymeric components of the ink(s) to thereby precipitate or otherwise fix the ink(s) to the print media surface.

The precipitated colorants deposit on the surface of the media, which results in the enhancement of image quality attributes, for example, optical density and chroma. Durability attributes like water-fastness and highlighter smear also benefit from such reactive ink chemistry. Although several suitable ink sets including a fixer fluid are currently available, improvements thereto are desirable to formulate more durable and reliable inks that will produce higher quality print images on the print media surface without damaging the printhead containing it.

BRIEF DESCRIPTION OF THE DRAWING

In order to better understand the present disclosure, some embodiments will be described below by way of non-limiting examples only, with reference to FIGURES, wherein.

DETAILED DESCRIPTION

Before particular embodiments of the present invention are disclosed and described, it is to be understood that the present disclosure is not limited to the particular process and materials disclosed herein as such and may vary to some degree. It is also to be understood that the terminology used herein is used for describing particular embodiments only and is not intended to be limiting, as the scope of the present invention will be defined only by the appended claims and equivalents thereof. In describing and claiming the present exemplary composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated.

As used herein, "image" refers to marks, signs, symbols, FIGURES, indications, and/or appearances deposited upon a material or substrate with either visible or an invisible ink composition. Examples of an image can include characters, words, numbers, alpha-numeric symbols, punctuation, text, lines, underlines, highlights, and the like. As used herein, "inkjet image" refers to image that is generated by the use of inkjet device and/or inkjet ink.

In some embodiments, the present disclosure refers to an inkjet fixer composition that includes up to about 1.5 wt % of surfactants, from about 1 to about 20 wt % of humectants, from about 3 to about 16 wt % of a metal carboxylate salt as fixer agent, and an acid in view of adjusting the pH of said composition to a pH between about 5.0 and about 7.0.

In some other embodiments, the present disclosure refers to an inkjet set including, at least, an inkjet ink composition that includes a colorant dispersed in an ink vehicle and a fixer fluid including up to about 1.5 wt % of surfactants, from about 1 to about 20 wt % of humectants, from about 3 to about 16 wt % of a metal carboxylate salt as fixer agent, and an acid in view of adjusting the pH of said composition to a pH between about 5.0 and about 7.0.

In addition, the present disclosure refers to a system for printing durable inkjet images, including a first inkjet pen containing a fixer composition such as describe herein and, one or several, successive inkjet pen(s) containing inkjet ink composition, said inkjet ink composition containing an aqueous liquid vehicle and a colorant.

In yet some other embodiments, the present disclosure refers to a method for printing durable inkjet images onto a substrate, including jetting a fixer composition onto the substrate, then jetting, at least, an inkjet ink composition onto the substrate. Said inkjet ink composition includes an aqueous liquid vehicle and a colorant. In such method, the inkjet ink composition overprint said fixer composition and said fixer composition includes up to about 1.5 wt % of surfactants, from about 1 to about 20 wt % of humectants, from about 3 to about 16 wt % of a metal carboxylate salt as fixer agent, and an acid in view of adjusting the pH of said composition to a pH between about 5.0 and about 7.0.

Without being linked by any theory; it is believed that after the fixer composition is overprinted with the inkjet ink composition on the substrate or, in other words, when ink and fixer meet on the media surface, a very effective crashing of ink colorants is realized and nearly all the colorants are deposited on the surface of the media rather than penetrating the media and depositing below the surface. Concurrently, the fixer vehicle, upon mixing with the ink vehicle, becomes highly wetting and the mixed vehicle quickly penetrates the media, leaving the colorants behind.

Within such inkjet printing method, the combination of the fixer fluid and of the inkjet ink composition results in a system and method that provide high quality and durable inkjet image prints. The use of the fixer fluid of the present disclosure results in the enhancement of image quality attributes, for example, optical density, chroma, and durability. Furthermore, the fixer fluid composition provides good image quality without adversely affecting inkjet architecture reliability when used in inkjet printing system. Indeed, it has been found that the fixer fluid does not display damages to the printhead containing it and displays a low corrosivity toward inkjet system and inkjet pen.

The "fixing fluid" or "fixer fluid" contains an aqueous vehicle and an effective amount of one or more fixing agents. A fixer agent is an ingredient that initiates a change in the solubility or stability of the colorant and fixes the colorant in place in the printed image. An "effective amount" of fixer agent is an amount that is effective in achieving an improvement in print quality, e.g., decreased strikethrough and bleed, increased optical density (OD), chroma, edge acuity, and improved drip and smear fastness, as compared to a print that has not been fixed. The fixing fluid can be formulated for high spread and quick penetration and drying. The surface tension can be less than about 45 mN/m.

In some embodiments, the inkjet fixer composition contains up to about 1.5 wt % of surfactants, from about 1 to about 20 wt % of humectants, from about 3 to about 16 wt % of a metal carboxylate salt as fixer agent, and an acid in view of adjusting the pH of said composition to a pH between about 5.0 and about 7.0.

In some other embodiments, the inkjet fixer composition contains up to about 1.5 wt % of surfactants, from about 1 to about 20 wt % of humectants, from about 3 to about 16 wt % of a fixer agent selected from the group consisting of calcium propionate salt, calcium acetate salt or calcium butyrate salt, and an acid in view of adjusting the pH of said composition to a pH between about 5.0 and about 7.0.

In yet some other embodiments, the inkjet fixer composition includes up to about 1.5 wt % of surfactants, from about 1 to about 20 wt % of humectants, from about 6 to about 7 wt % of calcium propionate, and methanesulfonic acid in view of adjusting the pH of said composition to a pH between about 5.0 and about 7.0.

In some embodiments, the fixer fluid of the present disclosure improve print quality and durability of the printed ink on a medium, i.e. increase the water-fastness, smudge-fastness, and/or light-fastness of the inks, while not being corrosive to the printhead or pen that houses it.

In some embodiments, the inkjet fixer composition includes a fixer agent, said fixer agent is a metal carboxylate salt. As metal carboxylate salt, it is meant herein a metal salt composed of a multivalent metallic ion and of a carboxylate ion.

Exemplary embodiments of the fixer compositions include a multivalent metal carboxylate salt. Such multivalent metal is selected from the group consisting of divalent metallic ions such as $Ca^{2+}$, $Mg^{2+}$, $Cu^{2+}$ and trivalent metal ions such as $Al^{3+}$, $La^{3+}$ or $Fe^{3+}$. In some embodiments, the metal is $Ca^{2+}$.

As examples, the carboxylate ions are aliphatic monocarboxylic acids having from 1 to 6 carbon atoms. As other examples, the carboxylate ions include acetic acid, propionic acid, butyric acid, isobutyric acid, valeric acid, isovaleric acid, pivalic acid and hexanoic acid. In a more specific example, the carboxylate ion is acetic acid, propionic acid or butyric acid.

In some embodiments, the fixer agent is selected from the group consisting of calcium propionate, calcium acetate or calcium butyrate. In yet other embodiments, the fixer agent is calcium propionate.

In some embodiments, the fixer agent is present in the fixer fluid composition in an amount representing from about 3 to about 16 wt % of the total weight of the fixer fluid composition. In some other embodiments, the fixer agent is present in an amount representing from about 5 to about 10 wt % of the total weight of the fixer fluid composition. In yet some other embodiments, the fixer agent is present in an amount representing from about 6 to about 7 wt % of the total weight of the fixer fluid composition. In some other embodiments, the fixer agent is present in the fixer fluid composition in an amount representing about 6.5 wt % based on the total weight of the fixer fluid composition.

In some embodiments, the fixer fluid contains an acid. Any suitable acid may be selected. In some embodiments, a strong acid (i.e., an acid that is fully ionized in water) is added to the fixer fluid composition. Non-limiting examples of such acids include methanesulfonic acid, hydrochloric acid, nitric acid, hydrobromic acid, sulfuric acid, perchloric acid, hydroiodic acid, trifluoroacetic acid, and/or combinations thereof. In some embodiments, the acid is methanesulfonic acid. The acid helps to adjust the pH of the fixer fluid composition. In some embodiments, the pH of the fixer fluid composition is between about 5.0 and about 7.0. In some other embodiments, the pH of the fixer fluid composition is between about 5.7 and about 6.3. In yet some other embodiments, the pH of the fixer fluid composition is about 6.

In some embodiments, the fixer formulation will not form or will form less than 0.5% of acid vapors (volatile organic acid) upon assembly. In some other embodiments, the pH of the fixer fluid will be adjusted to within a suitable range to avoid fixer fluid composition containing more than 0.5 wt % of volatile organic acid.

In some embodiments, the fixer fluid contains surfactants. Non-limiting examples of suitable surfactants include nonionic surfactant, cationic surfactant and combinations thereof. In some examples, the surfactants are nonionic surfactants. In some other examples the surfactant are nonionic surfactants selected from the group consisting of nonionic fluorosurfactant, nonionic acetylenic diol surfactant, nonionic ethoxylated alcohol surfactant and, combinations thereof. In a non-limitative example, the fixer fluid composition contains nonionic ethoxylated alcohol surfactant.

Several commercially available nonionic surfactants may be used in the formulation of the fixer fluid, examples of which include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), manufactured by Air Products and Chemicals, Inc.; fluorinated surfactants, such as those from the Zonyl® family (e.g., Zonyl® FSO and Zonyl® FSN surfactants), manufactured by E.I. DuPont de. Nemours and Company; fluorinated Poly-Fox® nonionic surfactants (e.g., PF159 nonionic surfactants), manufactured by Omnova; or combinations thereof. Suitable cationic surfactants that may be used in the fixer fluid include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

In some embodiments, the surfactant is present in the fixer fluid in an amount up to about 1.5 weight percentage (wt %). As a non-limiting example, the surfactant is present in an amount ranging from about 0.1 wt % to about 1 wt %. In still another non-limiting example, the surfactant is present in an amount ranging from about 0.2 wt % to about 0.6 wt %.

In some embodiments, the fixer fluid of the present disclosure includes humectants. As "humectant", it is meant herein any substance used as a wetting or moistening agent. Without being linked by any theory, humectants maintain the fixer water content in a narrow range regardless of humidity fluctuations and are therefore often added in order to prevent clogging of narrow inkjet pen nozzles.

Humectants are high-boiling water-miscible organic compounds, such as polyols, amides, or polyethers. In some embodiments, the humectants are water-soluble. Exemplary water-soluble humectants suitable for this purpose include, but are not limited to, heterocyclic ketones (e.g., 2-pyrrolidone, N-methyl-pyrrolid-2-one, 1,3-dimethyl-imidazolid-2-one, octyl-pyrrolidone, etc.); glycols (e.g., ethylene glycol, diethylene glycol, triethylene glycol, tetraethylene glycol, propylene glycol, polyethylene glycol, polypropylene glycol, etc.); glycerols; and diols (e.g., butanediol, pentanediol, hexanediol, etc.). Specific examples include diethylene glycol, tetraethylene glycol, trimethylolpropane, glycerol, and 2-pyrrolidinone. In some embodiments, the humectant is tetraethylene glycol.

The total concentration of humectant may be present in the range of from about 1 to about 20 wt % by total weight of the fixer fluid; in other embodiments, in the range of from about 3 to about 17 wt %, and, in yet other embodiments, in the range of from about 5 to about 15 wt %.

In some embodiments, the fixer fluid of the present disclosure contains an aqueous vehicle. The term "aqueous vehicle," as defined herein, refers to the aqueous mix in which the fixer agent is placed to form the fixer fluid. Examples of suitable aqueous vehicle components include, but are not limited to, water, co-solvents, surfactants, additives (corrosion inhibitors, salts, etc.), and/or combinations thereof.

In some embodiments, the aqueous vehicle includes a water soluble organic co-solvent, a surfactant, and water. Non-limiting examples of the water soluble organic co-solvent include 2-ethyl-2-hydroxymethyl-1,3-propanediol, glycerol propoxylate, tripropylene glycol, 1-(2-hydroxyethyl)-2-pyrrolidinone, 1-(2-hydroxyethyl)-2-imidazolidinone, and/or combinations thereof.

One or more additives may also be incorporated into any of the embodiments of the fixer composition. As used herein, the term "additive" refers to a constituent of the fluid that operates to enhance performance, environmental effects, aesthetic effects, or other similar properties of the fluid. Examples of suitable additives include biocides, sequestering agents, chelating agents, anti-corrosion agents, marker dyes (e.g., visible, ultraviolet, infrared, fluorescent, etc.) and/or the like, and/or combinations thereof. In some embodiments, the fixer includes an anti-corrosion agent such as, for example, Cobratec®CBT, a carboxybenzotriazole that is commercially available from PMC Specialties Group, Inc. In other embodiments, the additives are present in the fixer composition in an amount ranging from about 0.01 wt % to about 1 wt %. It is to be understood that the upper limit of the amount of additive present depends, at least in part, on the additive used, the impact on the image, its solubility, the impact on pen function, and/or combinations thereof. In some embodiments, about 0.10 wt % of the additive is present. In still other embodiments, no additives are present.

As disclosed herein, the inkjet ink set includes some embodiments of the previously described fixer fluid composition and an ink having a colorant dispersed or dissolved in an ink vehicle. In some embodiments, the inkjet ink set include, at least, an inkjet ink composition including a colorant dispersed in an ink vehicle, and a fixer fluid including: up to about 1.5 wt of surfactants, from about 1 to about 20 wt % of humectants, from about 3 to about 16 wt % of a metal carboxylate salt as fixer agent, and an acid in view of adjusting the pH of said composition to a pH between about 5.0 and about 7.0

It is to be understood that any number of colored ink compositions may be included in the ink set with the fixer. Furthermore, any desirable combination of colored inks may be used. For example, each of the colored ink compositions may be of a different color, or two or more of the inks may be different shades of the same color (i.e., light magenta and dark magenta inks). In some embodiments, the inkjet ink set includes four different colored inks: a black ink, a yellow ink, a cyan ink, and a magenta ink. In other embodiments, the inkjet ink set includes any desirable number of inks selected from black ink, yellow ink, cyan ink, magenta ink, orange ink, red ink, green ink, and/or combinations thereof. In some embodiments, the inkjet ink set includes the fixer fluid such as described herein and includes an inkjet ink composition selected from a black ink, a yellow ink, a cyan ink, a magenta ink, an orange ink, a red ink, and a green ink, and wherein the ink set further includes at least one other ink selected from a black ink, a yellow ink, a cyan ink, a magenta ink, an orange ink, a red ink, and a green ink.

The fixer and at least one ink are incorporated into an ink set. In some embodiments, the ink set includes some embodiments of the fixer/fixing fluid, and any number of inks, all deposited into individual pens. Non-limiting examples of suitable pen configurations for the ink set include single pens, dual chamber pens, tri-chamber pens, brick heads, and/or the like, and/or combinations thereof.

As an example, the inkjet ink set is part of a printing system for printing durable inkjet images. Said printing system contains a first inkjet pen containing a fixer composition, said fixer composition including up to about 1.5 wt % of surfactants, from about 1 to about 20 wt % of humectants, from about 3 to about 16 wt % of a metal carboxylate salt as fixer agent, an acid in view of adjusting the pH of said composition to a pH between about 5.0 and about 7.0; and contains one or several successive inkjet pen(s) containing inkjet ink composition, said inkjet ink composition including an aqueous liquid vehicle and a colorant. In an example, the inkjet pens are thermal inkjet pens.

In some examples, the printing system includes a first inkjet pen containing a fixer composition and four different successive inkjet pens containing respectively, black, cyan, magenta and yellow inkjet ink compositions.

The ink set and the ink printing system, including the fixer composition of the present disclosure, in addition to black and color inks, present excellent printing performances and image characteristics and, in addition, have low corrosivity towards metals (e.g., steel, aluminum). The ink set and the ink printing system have thus reduced corrosivity toward inkjet pens and printheads.

In some embodiments, the present disclosure refers to an inkjet set containing an inkjet ink composition including a colorant dispersed in an ink vehicle and a fixer fluid composition such as described above. In some embodiments, the inkjet ink composition includes one or more colorant(s), an aqueous vehicle and, optionally, other ingredients such as surfactants, dispersants, binders, and/or other additives and adjuvants well known in the relevant art. In some embodiments, in the inkjet ink set such as defined above, the colorant is selected from a yellow colorant, a magenta colorant, a cyan colorant and a black colorant, and the ink vehicle includes: at least one solvent present in an amount ranging from about 1 to about 25 wt %; at least one surfactant present in an amount ranging from about 0.1 to about 8 wt %; at least one polymer present in an amount ranging from about 0.1 to about 4 wt %; at least one additive present in an amount up to about 0.2 wt %; and water.

The colorant for each ink is selected from a pigment, a dye, or combinations thereof. In some embodiments, the ink contains pigments as colorants. As used herein, "pigment" refers to a colorant particle that is substantially insoluble in the liquid vehicle in which it is used. Pigments can be dispersed using a separate dispersing agent, or can be self-dispersed, having a dispersing agent attached to the surface of the pigment. As used herein, "self-dispersed" generally refers to pigments that have been functionalized with a dispersing agent, such as by chemical attachment of the dispersing agent to the surface of the pigment. The dispersing agent can be a small molecule or a polymer or oligomer. The pigments include both self-dispersed pigments as well as dispersed pigments, e.g., pigments dispersed by a separate dispersing agent that is not covalently attached to the surface. In one example, the pigments are not self-dispersing, and a dispersing aid may be added to the vehicle. In another example, the pigments are self-dispersable and modified to include at least one polymer chemically attached thereto.

In some embodiments, the colorant for the cyan and/or magenta inks is a combination of a pigment and a dye. The pigments and/or dyes for the cyan and magenta colorants may be selected from several commercially available pigments and/or dyes. Non-limiting examples of suitable pigments for the cyan colorant include pigment blue 1, pigment blue 2, pigment blue 3, pigment blue 15:3, pigment blue 15:4, pigment blue 16, pigment blue 22, vat blue 4, vat blue 6, and/or the like, and/or combinations thereof. Examples of suitable dyes for the cyan colorant include, but are not limited to triphenylmethane dyes, such as, for example, acid blue 9 and acid blue 7, and phthalocyanine dyes, such as, for example, direct blue 199. Non-limiting examples of suitable pigments for the magenta colorant include pigment red 5, pigment red 7, pigment red 12, pigment red 48, pigment red 48, pigment red 57, pigment red 112, pigment red 122, and/or the like, and/or combinations thereof. Examples of suitable dyes for the magenta colorant include, but are not limited to, xanthene dyes, such as, for example, acid red 52, acid red 289, γ-acid dyes, H-acid dyes, and/or combinations thereof.

In other embodiments, the colorant for the black and/or the yellow ink is a dye or a pigment. Examples of suitable dyes for the black colorant include, but are not limited to water soluble metal complex azo dyes such as Reactive Black 31 and Reactive Black 8, water soluble polyazo dyes such as Direct Black 19, Direct Black 195, and Direct Black 168, and water soluble sulfur dyes such as Solubilized Sulfur Black 1. Materials such as carbon black or derivatives of carbon black are non-limiting examples of suitable pigments for the black ink.

Examples of suitable dyes for the yellow colorant include, but are not limited to AY-17, AY-23, DY-132, Y-104, and/or combinations thereof. PY-74 is a non-limiting example of a suitable pigment for the yellow ink.

It is to be understood that one or more of the inks in the ink set may contain substantially the same colorant and/or substantially the same ink vehicle formulation. In an example, the ink set includes the yellow ink, the cyan ink, and the magenta ink, each of which has substantially the same ink vehicle formulation.

In some embodiments, the amount of colorant present in the respective ink compositions ranges from about 2.75 wt % to about 4.5 wt %. It is to be understood however, that the colorant loading may be more or less, as desired.

Each colorant or combination of colorants is combined with respective individual ink vehicles to form one or more inks of the ink set. As defined herein, an "ink vehicle" refers to the vehicle in which the colorant is placed to form the ink. A wide variety of ink vehicles may be used with the inks, ink sets, and methods according to embodiments disclosed herein. Non-limiting examples of suitable components for the ink vehicle include water soluble polymers, anionic polymers, surfactants, solvents, co-solvents, buffers, biocides, sequestering agents, viscosity modifiers, surface-active agents, chelating agents, resins, and/or water, and/or combinations thereof.

Suitable solvents for the ink vehicle include, but are not limited to glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, Dantocol® DHE (Lonza Inc., Fairlawn N.J.), and/or combinations thereof. Inks used in combination with the fixer having at least the amine-N-oxide and the acid therein may include one or more of the following solvents: ethylene glycol, diethylene glycol, triethylene glycol, or 1-propoxy-2-propanol. In a non-limiting example, the solvents are present in the ink vehicle in an amount ranging from about 1 wt % to about 25 wt %. In another non-limiting example, the solvent(s) are present in the ink vehicle in an amount ranging from about 5 wt % to about 20 wt %. In still another non-limiting example, the solvents are present in the ink vehicle in an amount ranging from about 8 wt % to about 18 wt %. The amount and type of solvent used depends, at least in part, on the desirable properties of the ink. As such, the amounts may vary as desired. In some embodiments, a single solvent is used in the ink vehicle of one or more of the colored inks. Examples of such solvents include, but are not limited to tripropylene glycol, tetraethylene glycol, or 1-(2-hydroxyethyl)-2-pyrrolidone. In other embodiments, the inks include a mixture of two or more of the previously listed solvents.

As non-limiting examples, the cyan, magenta, yellow and black inks include a mixture of Dantocol® DHE and 1-(2-hydroxyethyl)-2-pyrrolidone. In some embodiments, the total weight percent of the solvent mixture ranges froth about 7 wt % to about 22 wt %. In other embodiments, the total weight percent of the solvent mixture ranges from about 12 wt % to about 17 wt %. In still other embodiments, the total weight percent of the solvent mixtures ranges from about 6 wt % to about 15 wt %.

The surfactants for the ink vehicle are generally nonionic or anionic. Suitable nonionic surfactants include, but are not limited to ethoxylated alcohols, fluorinated surfactants, 2-diglycol surfactants, and/or combinations thereof. Specific examples of nonionic surfactants include surfactants from the Surfynol® series (e.g., Surfynol® CT211, Surfynol® SEF), manufactured by Air Products and Chemicals, Inc., in addition to the surfactants (e.g., Tergitol®) provided hereinabove for the aqueous vehicle of the fixer.

Non-limiting examples of suitable anionic surfactants for the ink vehicle include those anionic surfactants of the Dowfax® family (e.g., Dowfax® 8390), manufactured by Dow Chemical Company, located in Midland, Mich., or anionic Zonyl® surfactants (e.g., Zonyl® FSA), manufactured by E.I. DuPont de Nemours and Company; phosphate ester surfactants including the surfactants of the Emphos® series and the DeDophoS® series, both manufactured by Witco Corp., Middlebury, Conn., the surfactants of the Hostaphat® series, manufactured by Clariant GmbH, Frankfurt, Germany, the surfactants of the ESI-Terge® series, manufactured by Cook Composites and Polymers Co., Kansas City, Mo., the surfactants of the Emulgen® series, manufactured by Kao Specialties Americas LLC, High Point, Nalco, the surfactants of the Crodafos® series, manufactured by Croda Inc., Edison, N.J., the surfactants of the Dephotrope® series and of the DePHOS® series, both manufactured by DeForest Enterprises Inc., Boca Raton, Fla.; alkyl sulfates (e.g., lauryl sulfate), alkyl ether sulfates (e.g., sodium laureth sulfate); N-lauroyl sarcosinate; dodecylbenzene sulfonate; and/or combinations thereof. In some embodiments, the ink vehicle includes one or more surfactants present in an amount up to about 8 wt %, with other non-limiting examples including from about 0.1 wt % to about 6 wt % and from about 1.2 wt % to about 2 wt %.

In some embodiments, the ink vehicle includes at least one polymer present in an amount ranging from about 0.01 wt % to about 4 wt %. In other embodiments, the ink vehicle includes at least one polymer present in an amount ranging from about 0.1 wt % to about 1.5 wt %. The polymers for the ink vehicle are generally water-soluble, and may be selected from those of the salts of styrene-(meth)acrylic acid copolymers, polystyrene-acrylic polymers, polyurethanes, and/or other water-soluble polymeric binders, and/or combinations thereof. Non-limiting examples of suitable polyurethanes include those that are commercially available from Dainippon Ink & Chem., Inc. (DIC), located in Osaka, Japan.

As a non-limiting example, one class of polymeric binders suitable for use in the ink includes salts of styrene-(meth)acrylic acid copolymers. A salt of a styrene-(meth)acrylic acid copolymer includes at least a styrene skeleton and a skeleton of the salt of the styrene-(meth)acrylic acid copolymer in its structure. It may also contain a skeleton derived from a monomer having another unsaturated group, such as a (meth)acrylate skeleton, in its structure. Suitable non-limiting examples of styrene-(meth)acrylic acid copolymers are commercially available and may be selected from the Joncryl® series (e.g., Joncryl® 586 and 683), manufactured by BASF, Corp. located in Florham Park, N.J.; SMA-1000Na and SMA-1440K, manufactured by Sartomer, located in Exton, Pa.; Disperbyk 190, manufactured by BYK Chemicals, located in Wallingford, Conn.; polystyrene-acrylic polymers manufactured by Gifu Shellac, located in Japan; or combinations thereof.

Additives may also be incorporated into embodiments of the ink vehicle for the inks. As a non-limiting example, bactericides, such as Proxel® GXL, may be added to the ink to protect the ink from bacterial growth. Other suitable additives include, but are not limited to, buffers, biocides, sequestering agents, chelating agents, or the like, or combinations thereof. In some embodiments, the ink vehicle includes one or more additives present in an amount ranging from about 0.1 wt % to about 0.5 wt %. In other embodiments, no additives are present.

The inks are generally prepared by combining the solvents, the surfactants, any additive(s), and water, and adjusting the pH to a basic pH. In some embodiments, the pH of the colored ink ranges from about 8 to about 11. In other embodiments, the pH of the colored ink ranges from about 8.5 to about 9.5. Colorants and polymers are then added to form the ink compositions.

An exemplary method for printing durable inkjet images onto a substrate contains, firstly, jetting a fixer composition onto the substrate, said fixer composition containing up to about 1.5 wt % of surfactants, from about 1 to about 20 wt % of humectants, from about 3 to about 16 wt % of a metal carboxylate salt as fixer agent, and an acid in view of adjusting the pH of said composition to a pH between about 5.0 and about 7.0. Then, an inkjet ink composition is jetted onto said substrate, said inkjet ink composition includes an aqueous liquid vehicle and a colorant, wherein the inkjet ink composition overprints said fixer composition. In some other embodiments, the steps of jetting are done by the use of thermal inkjet pens.

In some embodiments, the ink composition is established on at least a portion of the substrate to form an image. The fixer is established under the ink composition, over the ink composition, or combinations thereof. In some example, the fixer is established under the ink composition. The amount of fixer and/or ink composition used depends, at least in part, on the desirable image to be formed.

As an illustrative example, the substrate is paper (non-limitative examples of which include plain copy paper or papers having recycled fibers therein), plain offset printing papers in roll form or photo-paper, and/or combinations thereof. In some embodiments, the substrate has a thickness along substantially the entire length ranging between about 0.025 mm and about 0.5 mm.

A non-limiting example of a suitable inkjet printing technique includes drop-on-demand inkjet printing, which encompasses thermal and piezoelectric inkjet printing. Suitable printers include portable drop-on-demand inkjet printers (e.g., handheld printers, arm mountable printers, wrist mountable printers, etc.), desktop drop-on-demand inkjet printers, page wide array drop-on-demand printers/copiers, high-speed production printers, or combinations thereof.

The fixer solution can be applied onto the media substrate by any method available to spread the fixer accurately onto the substrate surface to be printed. For example, the fixer solution can be filled in a thermal inkjet pen and the fixer applied on the media or substrate before and/or after the colored ink is applied. As a non-limiting example, an HP Business Inkjet 2200 can be used.

In some embodiments, with respect to each of the system, method, and composition described herein, the fixer composition (and optionally, the inkjet ink composition) can be configured for firing or jetting from thermal inkjet architecture.

The following examples illustrate a number of embodiments of the present compositions, systems and methods that are presently known. However, it is to be understood that the following are only exemplary or illustrative of the application of the principles of the present compositions, systems and methods. Numerous modifications and alternative compositions, methods, and systems may be devised by those skilled in the art without departing from the spirit and scope of the present disclosure. The appended claims are intended to cover such modifications and arrangements. Thus, while the present compositions, systems and methods, have been described above with particularity, the following examples provide further detail in connection with what are presently deemed to be acceptable embodiments.

Example 1

Preparation of InkJet Ink Composition

A black inkjet ink composition is prepared in accordance with TABLE 1 below.

TABLE 1

| Component | Amount (wt %) |
|---|---|
| LEG-1 | 1% |
| 2-Hydroxyethyl-2-pyrrolidinone | 1.5% |
| Dantocol ® DHE | 8% |
| Crodafos ® N3 acid | 0.5% |
| Zonyl ® FSO | 0.1% |
| Surfynol ® SEF | 0.85% |
| Proxel ® GXL | 0.1% |
| DIC PU RW ® 3033 | 1% |
| DIC HPC ® K040 | 2.75% |
| Water | Balance |

LEG-1 is a co-solvent available from Liponics. Dantocol® DHE is available from Lonza, Inc. Crodafos® N-3 acid is available from Croda Inc. Zonyl® FSO is a surfactant available from Dupont Inc. Surfynol® SEF is a surfactant available from Air Products. Proxel® GXL is a biocide available from Avecia. DIC PU RW® 3033 and DIC HPC®K040 are pigments available from Dainippon Ink Chemicals. Kordek® MLX is a biocide available from Rohm and Haas Tergitol® 15-S-30 and Tergitol® 15-S-9 are surfactants available from Dow Chemical. Cobratec® CBT is a Carboxybenzotriazole available from PMC Specialties Group, Inc. Chemguard® S550-100 is a fluorosurfactant available from Chemguard Inc.

Example 2

Preparation of Fixer Fluid Composition

Inkjet fixer compositions 1 through 8 are prepared in accordance with TABLE 2. All percentages are expressed by weight, based on the total weight of the fixer fluid composition.

TABLE 2

| Components | 1 | 2 | 3 | 4 | 5 | 6 | 7 | 8 |
|---|---|---|---|---|---|---|---|---|
| Calcium propionate | 6.5% | 6.5% | — | 6.5% | 6.5% | 6.5% | 10% | 6.5% |
| Calcium acetate hydrate | — | — | 8% | — | — | — | — | — |
| Kordek ® MLX | 0.14% | 0.14% | 0.14% | 0.14% | 0.14% | — | — | — |
| Proxel ® GXL | 0.1% | 0.1% | 0.1% | 0.1% | 0.1% | — | — | — |
| Tetraethylene glycol | 12% | 12% | 12% | 12% | 12% | 12% | 12% | — |
| 2,2'Dihydroxymethyl butanol | — | — | — | — | — | — | — | 10% |
| Tergitol ® 15-S-9 | 0.1% | — | — | — | — | — | — | — |
| Tergitol ® 15-S-30 | 0.2% | 0.3% | 0.3% | 0.25% | 0.3% | 0.3% | 0.3% | 0.3% |
| Chemguard ® S550-100 | — | — | — | 0.05% | — | — | — | — |
| Cobratec ® CBT | — | — | — | — | 0.1% | — | — | — |
| Nitric acid | — | — | — | — | — | 0.25% | — | — |
| Methanesulfonic acid | 0.38% | 0.38% | 0.24% | 0.38% | 0.38% | — | 0.58% | 0.38% |
| Deionized water | balance | balance | balance | balance | balance | balance | balance | balance |
| pH | 6 | 6 | 6 | 6 | 6 | 6 | 6 | 6 |

Fixer compositions 1 through 8 are tested in combination with the black ink illustrated in example 1. The ink and fixer compositions are established on Hewlett Packard Multipurpose plain paper using Hewlett Packard 88-type printheads. 18 ng/300 dpi of the respective fixer formulations are printed first and 48 ng/300 dpi of black ink is printed on top of each of the printed fixers. The images printed with the ink of example 1 in combination with fixer compositions 1 through 8, present excellent image quality and high optical density, in comparison to images printed with ink of example 1 but without the use of fixer composition.

Example 3

Solubility of Fixer Agent

Figure 1:
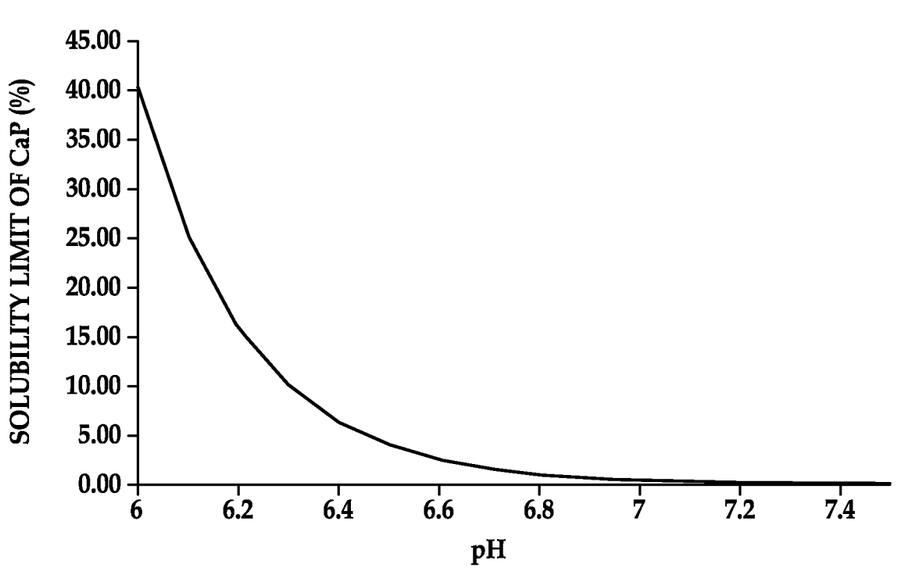
FIG. 1 is a chart representing the amount of calcium propionate salt that can be dissolved, at various pH values, in a fixer composition according to embodiments, of the present disclosure.

The fixer fluid composition 1, described in TABLE 2 of example 2, is evaluated for its capability of containing water-soluble calcium propionate salt in function of variation of pH. FIG. 1 is a chart demonstrating the amount of calcium propionate that can be dissolved in the fixer composition at various pH values, before calcium starts precipitating in the form of calcium carbonate in nozzles exposed to air. According to this result, it is clear that at a pH of 6.2, about 16 wt % calcium propionate can be present in the fixer without triggering any precipitation, whereas at a pH of 6.4 this value drops to 6.37%.

Example 4

Fixer Fluid Composition Performances

Different fixer fluid compositions A to D are evaluated for their printing performances and for their capacity of not damaging print nozzles. Fixer formulations A to D are illustrated in TABLE 3 below. Composition A, B and C are comparative examples.

TABLE 3

| Components | Composition A | Composition B | Composition C | Composition D |
|---|---|---|---|---|
| Calcium propionate salt | — | — | 3% | 6.5 wt % |
| Calcium nitrate salt | 3.8% | — | — | — |
| Calcium lactate salt | — | 4.97% | — | — |
| Tetraethylene glycol | 12% | 12% | 12% | 12 wt % |

TABLE 3-continued

| Components | Composition A | Composition B | Composition C | Composition D |
|---|---|---|---|---|
| Tergitol ® 15-S-30 | 0.2% | 0.2% | 0.2% | 0.2 wt % |
| Tergitol ® 15-S-9 | 0.1% | 0.1% | 0.1% | 0.1 wt % |
| Methanesulfonic acid | — | 0.85% | 2.48% | 0.38% |
| De-ionized water | Balance | Balance | Balance | Balance |
| pH | 7 | 4 | 4 | 6 |

Four fixer modules are filled with fixer compositions A through D. Each module is inserted into a HP T-300 web press, to the fixer slot adjacent to a module containing black ink having formulation such as illustrated in Example 1. Then, an identical image sequence is printed repeatedly with each fixer over 45 minutes and image quality is monitored visually. (A nozzle health pattern is printed at regular intervals as part of the test suite, which made it easy to visually recognize if any of the nozzles ceased firing or if there are misdirected drops, implying a partially obstructed nozzle). The results are illustrated in TABLE 4.

TABLE 4

| Composition tested | pH | Fixer agent | Effect on black print head | Image defect | Damage to the print head |
|---|---|---|---|---|---|
| A | 7 | Calcium nitrate | None | No | yes |
| B | 4 | Calcium lactate | None | No | yes |
| C | 4 | Calcium propionate | Adverse effect | Yes | No |
| D | 6 | Calcium propionate | None | No | No |

This test demonstrates that with compositions A, B and D, there are no misdirects or missing nozzles on the black pen after 45 minutes of printing and there are thus no image degradations. Whereas, with composition C, after 5 minutes of printing, the image quality is very poor due to a large number of missing or misdirected nozzles on the black pen. This reflects the fact that with composition C (which is the only composition containing more than 0.5 wt % volatile organic acids) the nozzle health of black ink modules deteriorated noticeably after 5 minutes of printing.

In addition, when repeating this sequence over time, compositions A and B present damages to the print heads: composition A forms oxide layers on the resistors during firing (which results thus in kogation problems) and composition B forms irreversible corrosion damages to the resistors present in the pen. Compositions C and D do not damage the printhead and/or the pen.

Example 5

Choice of the Fixer Agent

The fixer composition 1 as described in TABLE 2, is tested with several metallic salts (6.5 wt %) as illustrated below in TABLE 5. TABLE 5 below summarizes the effect of using other salts of calcium on the reliability and manufacturability of a fixer composition similar to the composition 1 described in TABLE 2. These results show that calcium salts other than metal carboxylate, are unsuitable for use as fixing agents due to reliability or manufacturability related issues.

TABLE 5

| fixer agent | Status - effect of composition containing it |
|---|---|
| Calcium acetate | Ok |
| Calcium propionate | Ok |
| Calcium butyrate | Ok |
| Calcium bromide | Corrosive to resistors |
| Calcium carbonate | Insoluble |
| Calcium chloride | Corrosive to resistors |
| Calcium citrate | Corrosive to resistors |
| Calcium cyanamide | Reacts with water |
| Calcium hydride | Reacts with water |
| Calcium phosphate | Insoluble |
| Calcium lactate | Corrosive to resistors |
| Calcium nitrate | Generates kogation problems |
| Calcium oxalate | Insoluble |
| Calcium sulfate | Insoluble |

The preceding description has been presented only to illustrate and describe exemplary embodiments of the present invention. Although certain example methods, compositions, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

The invention claimed is:

1. A fixer fluid composition, for inkjet printing, comprising:
   a. up to about 1.5 wt % of surfactants;
   b. from about 1 to about 20 wt % of humectants;
   c. from about 3 to about 16 wt % of a metal carboxylate salt as fixer agent; wherein the fixer agent is selected from the group consisting of calcium propionate, calcium acetate, and calcium butyrate; and
   d. an acid in view of adjusting the pH of said composition to a pH between about 5.0 and about 7.0.

2. The fixer fluid composition as defined in claim 1 wherein the fixer agent is calcium propionate.

3. The fixer fluid composition as defined in claim 1 wherein the fixer agent is present in an amount representing from about 5 to about 10 wt % of the total weight of the fixer fluid composition.

4. The fixer fluid composition as defined in claim 1 wherein the surfactant is selected from the group consisting of non-ionic surfactant, cationic surfactant and combinations thereof.

5. The fixer fluid composition as defined in claim 1 wherein the acid is selected from the group consisting of methanesulfonic acid, hydrochloric acid, nitric acid, hydrobromic acid, sulfuric acid, perchloric acid, hydroiodic acid, trifluoroacetic acid, and combinations thereof.

6. The fixer fluid composition as defined in claim 1 wherein the acid is methanesulfonic acid.

7. The fixer fluid composition as defined in claim 1 wherein the pH of said composition is adjusted to a pH between about 5.7 and about 6.3.

8. An inkjet ink set comprising:
   a. at least, an inkjet ink composition containing a colorant dispersed in an ink vehicle; and
   b. a fixer fluid composition containing:
      i. up to about 1.5 wt % of surfactants,
      ii. from about 1 to about 20 wt % of humectants,
      iii. from about 3 to about 16 wt % of a metal carboxylate salt as fixer agent, wherein the fixer agent is selected from the group consisting of calcium propionate, calcium acetate, and calcium butyrate, and
      iv. an acid in view of adjusting the pH of said composition to a pH between about 5.0 and about 7.0.

9. The inkjet ink set as defined in claim 8 wherein the colorant of the ink composition is a polymer dispersed or self-dispersed pigment.

10. The inkjet ink set as defined in claim 8 wherein the ink composition is selected from a black ink, a yellow ink, a cyan ink, a magenta ink, an orange ink, a red ink, and a green ink, and wherein the ink set further comprises at least one other ink selected from a black ink, a yellow ink, a cyan ink, a magenta ink, an orange ink, a red ink, and a green ink.

11. A system for printing durable inkjet images comprising:
   a. a first inkjet pen containing a fixer composition, said fixer composition comprising:
      i. up to about 1.5 wt % of surfactants,
      ii. from about 1 to about 20 wt % of humectants,
      iii. from about 3 to about 16 wt % of a metal carboxylate salt as fixer agent, wherein the fixer agent is selected from the group consisting of calcium propionate, calcium acetate, and calcium butyrate, and
      iv. an acid in view of adjusting the pH of said composition to a pH between about 5.0 and about 7.0; and
   b. one or several successive inkjet pen(s) containing inkjet ink composition, said inkjet ink composition comprising an aqueous liquid vehicle and a colorant.

12. The system as defined in claim 11 wherein the first and the successive inkjet pens are thermal inkjet pens.

13. A method for printing durable inkjet images onto a substrate comprising:
   a. jetting a fixer composition onto the substrate, said fixer composition comprises:
      i. up to about 1.5 wt % of surfactants,
      ii. from about 1 to about 20 wt % of humectants,
      iii. from about 3 to about 16 wt % of a metal carboxylate salt as fixer agent, wherein the fixer agent is selected from the group consisting of calcium propionate, calcium acetate, and calcium butyrate, and
      iv. an acid in view of adjusting the pH of said composition to a pH between about 5.0 and about 7.0; and
   b. jetting, at least, an inkjet ink composition onto said substrate, said inkjet ink composition comprising an aqueous liquid vehicle and a colorant, wherein the inkjet ink composition overprints said fixer composition.

* * * * *